United States Patent [19]

Finley

[11] Patent Number: 5,427,006

[45] Date of Patent: Jun. 27, 1995

[54] CIRCULAR SAW GUIDE

[76] Inventor: Joe Finley, Rte. 5, 122 Royal Ridge, Brazoria, Tex. 77422

[21] Appl. No.: 279,853

[22] Filed: Jul. 26, 1994

[51] Int. Cl.6 ............................................... B27B 9/04
[52] U.S. Cl. .................................... 83/574; 83/471.3; 83/477.2; 83/468.5; 83/486.1; 83/581
[58] Field of Search ...................... 83/471.3, 477, 477.2, 83/468.5, 468.6, 486.1, 581, 582, 745, 574

[56] References Cited

U.S. PATENT DOCUMENTS

| | | |
|---|---|---|
| 16,894 | 3/1857 | Woolston . |
| 2,377,673 | 6/1945 | Chaddock . |
| 2,596,524 | 5/1952 | Bridwell ............................ 83/468.1 |
| 2,818,892 | 1/1958 | Price .................................. 83/574 |
| 2,941,554 | 6/1960 | Long .................................. 83/468.1 |
| 3,368,574 | 2/1968 | Drumbore ........................ 83/574 |
| 3,645,306 | 2/1972 | Adams, Sr. . |
| 3,839,789 | 10/1974 | Valkowsky . |
| 4,128,940 | 12/1978 | Ong . |
| 4,181,057 | 1/1980 | Bassett ............................... 83/468.1 |
| 4,233,738 | 11/1980 | Dedrick . |
| 4,335,512 | 6/1982 | Sheps et al. . |
| 4,406,064 | 9/1983 | Goss . |
| 4,516,453 | 5/1985 | Parham, Jr. .................... 83/471.3 |
| 4,685,369 | 8/1987 | Beamer . |
| 4,761,884 | 8/1988 | Nguyen et al. . |
| 4,777,726 | 10/1988 | Flowers . |
| 4,856,394 | 8/1989 | Clowers . |
| 4,870,758 | 10/1989 | Fushiya . |
| 4,959,907 | 10/1990 | Buratty . |
| 4,995,288 | 2/1991 | DellaPolla ........................ 83/574 |
| 5,146,682 | 9/1992 | Blochle . |
| 5,159,759 | 11/1992 | Fringer . |
| 5,165,317 | 11/1992 | Findlay ............................. 83/574 |
| 5,301,726 | 4/1994 | Wojcik ............................. 144/253 J |

Primary Examiner—Eugenia Jones
Assistant Examiner—Allan M. Schrock
Attorney, Agent, or Firm—Richard C. Litman

[57] ABSTRACT

A saw guide for hand-held circular saws that aids the saw user in making straight cross and angled cuts. The guide utilizes a slotted saw track upon which the circular saw rests the base of the saw aligning flush against side walls of the track. The saw track is initially elevated above the workpiece by a spring loaded track support member and is brought in contact with the workpiece under a nominal downward force supplied by the saw user. Once the track is in contact with the workpiece, the saw is pushed along the track, its blade cutting through the underlying workpiece through a slot in the track, the track returning to its elevated position after the cut is completed. The track support member also employs a rotational coupling device with which the saw track may be locked in various angular positions relative to the workpiece for use when making angled cuts. For aligning the workpiece prior to cutting, the saw guide utilizes a floating fence which is brought flush with the top of the workpiece by the saw track when the track is pushed downward for a cut. To aid the saw user in setting the blade depth, the saw guide also includes a blade depth setting device with depth indicia printed thereon.

15 Claims, 7 Drawing Sheets

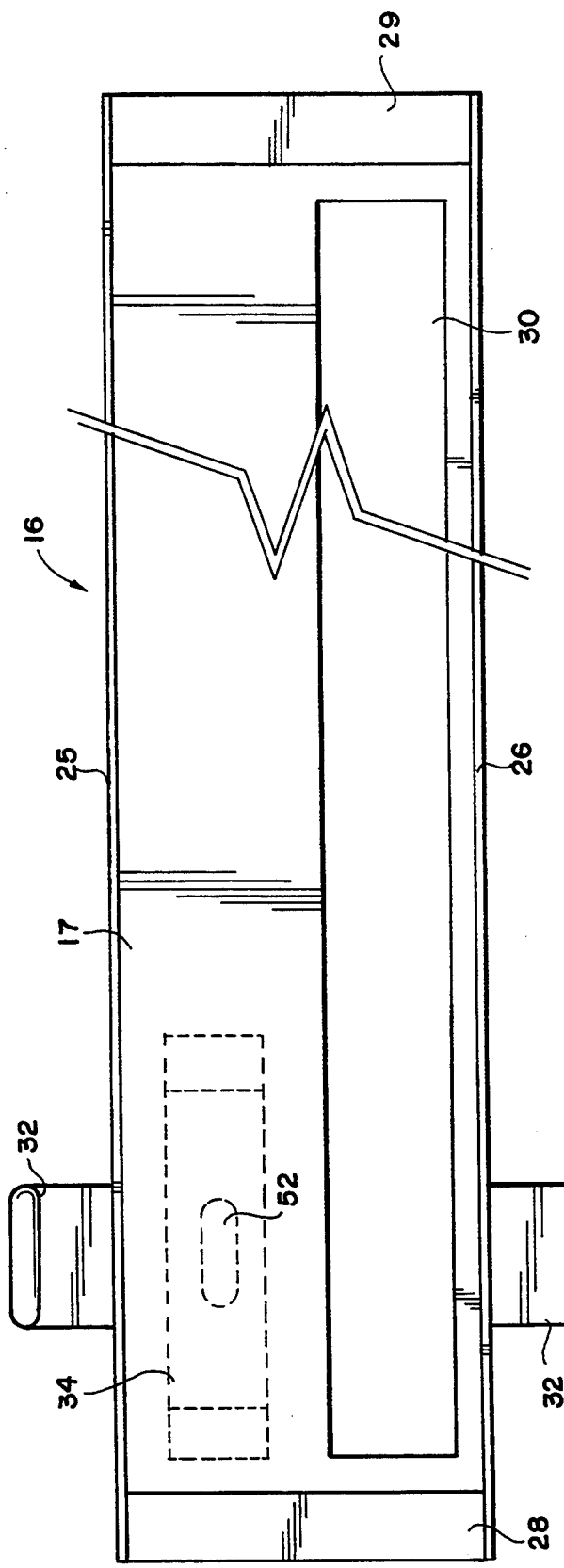
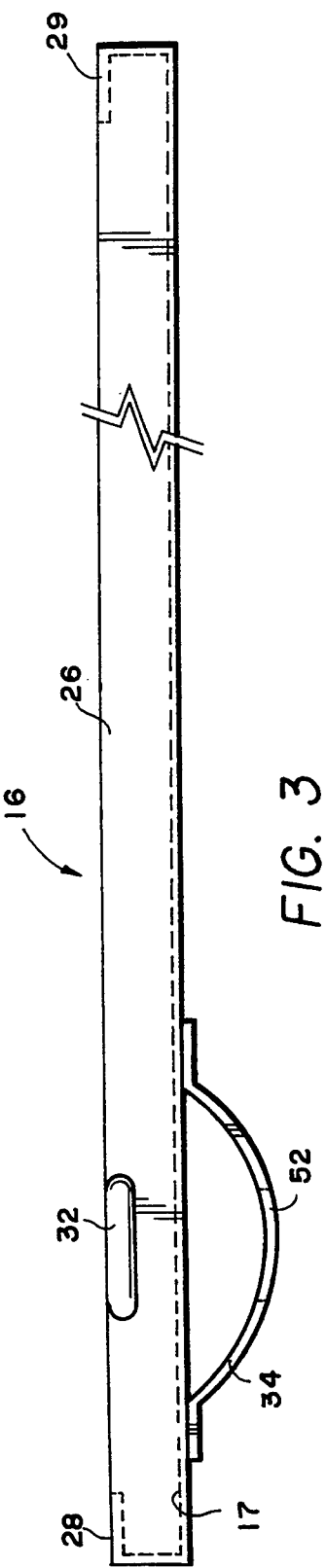
FIG. 2
FIG. 3

CIRCULAR SAW GUIDE

BACKGROUND OF THE INVENTION

1. Field of the Invention

The present invention relates to a saw guide, primarily for use with hand-held circular saws, to aid the saw user in making straight cross or angled cuts in wood or like materials.

2. Description of the Prior Art

Hand-held circular saws are frequently used for wood cutting due to their convenience, these saws being portable and simple to use. One drawback to these saws, however, is that it is often difficult to achieve a clean, straight edge along the cut line. To solve this problem, several saw guides have been created to aid the saw user in making straight cuts through wooden workpieces. Although several such guides are known, none has been created that combines accuracy, angular adjustability, and ease of use.

One prior art solution to the problem is shown in U.S. Pat. No. 3,645,306 which issued Feb. 29, 1972 to George F. Adams. In this patent, an angle guide for an electric saw is described that is designed to aid the user in making accurate cuts through wood or like material. Included in this design is a thin plate that is secured to a workbase with wing nuts and bolts. Through this plate are several slots through which the saw blade of a hand-held circular saw may pass. The device utilizes raised straight edge members that maintain flush contact with the sides of the saw base plate during the cut, preventing lateral movement of the saw. While the saw guide of this patent does provide for straight cutting, the design has several disadvantages. Among these disadvantages is the guide's limited adjustability. Although the guide can be angularly adjusted, as disclosed, the guide is limited to use in making only perpendicular cross-cuts, 45 degree cuts, and lengthwise cuts. No provision is made for cuts of other standard angulation such as 30 and 60 degrees. Another drawback of the design is that angular adjustment of the guide is somewhat cumbersome, the wing nuts having to be removed, the guide repositioned, and the wing nuts retightened. Although these steps are not unduly burdensome, they do require additional effort from the user, retarding the individual's productivity. Another adjustment difficulty is created due to the very narrow dimensioning of the cutting slots of the plate. Since these slots are so narrow, the guide rails must be precisely readjusted when a different model circular saw is used to ensure that the saw blade may pass through the slot without the plate interfering with the blade's rotation. A further disadvantage of the configuration shown in this patent is that the work guide is set at a fixed height, and is incapable of vertical displacement. Consequently, the saw guide is elevated above the workpiece during the cut. The saw blade must, therefore, be lowered substantially to account for this elevation, adding to the potential for injury to the saw user.

Another arrangement for a circular saw guide is shown in U.S. Pat. No. 4,128,940 issued Dec. 12, 1978 to Jose K. Ong. In this patent, a guide and adaptor is described for use with a hand-held circular saw. Similar to the Adams, Sr. patent, this guide utilizes a straight edge member against which the saw base abuts throughout the cut. Again, this design adequately provides for straight-line cutting, however, the application of this configuration is limited. One such limitation is that the apparatus is impractical for use in making cross-cuts through standard wooden boards. Primarily intended for lengthwise board cutting or cuts through wood sheeting, the arrangement cannot adequately be adapted for common cross-cutting. Moreover, the guide's lengthwise cutting is limited to cuts parallel with the edge of the workpiece at a predetermined distance from that edge. This limitation is due to the device's plate member configuration, these plates overlying a substantial portion of the workpiece during the cut.

An improvement on the guides discussed above is found in U.S. Pat. No. 4,335,512 issued Jun. 22, 1982 to Martin I. Sheps et al. In this patent, a guide device is described that is capable of providing for straight line cuts at assorted angles away from the perpendicular. This straight line cutting is achieved through the use of a guide track. An elongated guide bar attached to the circular saw base fits within the guide track channel such that the bar may only slide within the track along a straight line. Although allowing for straight line crosscutting and angled cutting, the elongated guide bar is intended to be either integral with the saw base or bolted thereto. If integral with the guide bar, the circular saw would be limited to use with the saw guide. If bolted to the saw base, the guide bar would have to be removed from the saw base each time the user would need the saw for another application. This renders this design inconvenient, the saw user losing mobility with the saw, thereby defeating one of the fundamental advantages of using a circular saw.

None of the above inventions and patents, taken either singly or in combination, is seen to describe the instant invention as claimed.

SUMMARY OF THE INVENTION

The present invention relates to a saw guide, for use primarily with hand-held circular saws, that aids the saw user in making straight, even cuts. The guide utilizes a slotted saw track upon which the circular saw rests. The track has side walls and is just wide enough to allow for the base of the saw to fit flush with the side walls. These side walls serve to prevent lateral movement of the saw during the cut, ensuring a clean straight-line cut through the workpiece.

In the preferred embodiment, the saw track is initially elevated above the workpiece with a track support member biased by a compression spring contained within a spring housing. The spring has enough bias to keep the track in this elevated position after the circular saw is placed atop the track. The spring is calibrated, however, to compress under a nominal downward force supplied by the saw user when a cut is being made. If desired, the saw user can lower the initial height of the saw track with a retaining rod, this rod having a retainer disposed about it below an extension of the spring housing that limits upward travel of the rod.

The track support member also employs a rotational coupling with which the saw track can be locked in assorted angular positions such that the guide may be used to make angled cuts. The coupling comprises two mating members, a lower member having a set pin and an upper member having several bored cavities for receiving the set pin. When the angle of the saw track is to be changed, the upper member is simply raised against the force of a biasing element within the coupling, turned to the appropriate angle and replaced atop the lower member, the set pin being received by an alternate bored cavity.

For abutting the workpiece immediately prior to cutting, the saw guide incorporates a fence suspended by biasing elements. During a cut, the fence is pressed downward with the saw track, becoming flush with the top surface of the workpiece.

Lastly, the saw guide incorporates a blade depth setting device which aids the saw user in adjusting the depth setting on the saw to ensure that the correct depth of cut is achieved.

Accordingly, it is a principal object of the invention to provide a circular saw guide that ensures accurate straight-line cuts at various angles.

It is a further object of the invention to provide a circular saw guide that is easily adjustable in both the angular and vertical directions.

Still another object of the invention is to provide a circular saw guide utilizing an integral floating fence arrangement.

It is still a further object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a top plan view of the saw track.

FIG. 3 is a right-side elevational view of the saw track.

Similar reference characters denote corresponding features consistently throughout the attached drawings.

DETAILED DESCRIPTION OF THE PREFERRED EMBODIMENT

Figure 1:
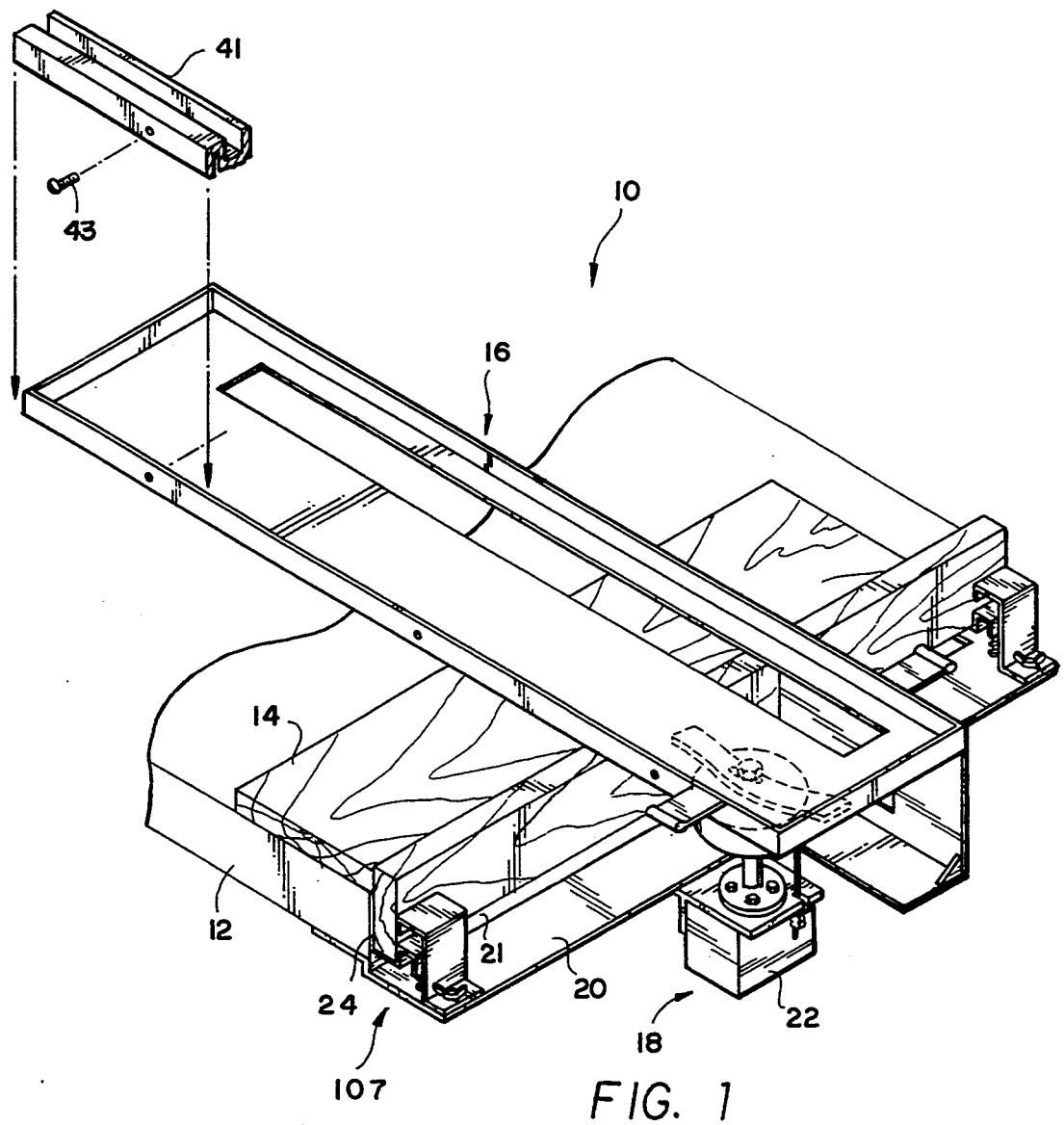
FIG. 1 is a partially exploded, environmental perspective view of the preferred embodiment shown attached to a standard workbench.

Referring to the drawings, FIG. 1 shows the circular saw guide 10 as it would be configured on a standard workbench 12, prepared for use in cutting the workpiece 14. The saw guide 10 is provided with a saw track 16 that rests atop a track support member 18 which provides for vertical displacement and angular adjustment of the saw track 16. The track support member 18 is mounted to the workbench 12 with a mounting bracket 20 with screws or bolts (not shown) that pass through mounting holes 19 (shown in FIG. 5). This bracket 20 is attached to the spring housing 22 of the track support member 18. The mounting bracket 20 has a slot 21 defined therethrough to allow for the removal of saw dust created during cutting. A fence 24 is included that serves as a stop to which the workpiece 14 abuts during the cut, ensuring the correct angle of cut.

As shown most clearly in FIGS. 2 and 3, the saw track 16, preferably constructed of a metal such as steel or aluminum, is tray-shaped, having a smooth track platform 17 provided with a saw blade slot 30 running a substantial length of this track platform 17. Also provided with the saw track 16 are a left side wall 25, a right side wall 26, a front-end wall member 28 and a rear-end wall member 29 which serve to maintain a circular saw in position during a cut. Attached to the right side wall 26 and the left side wall 25 are handles 32 which serve to aid the user during adjustment of the saw track 16 before cuts are made.

Figure 4:
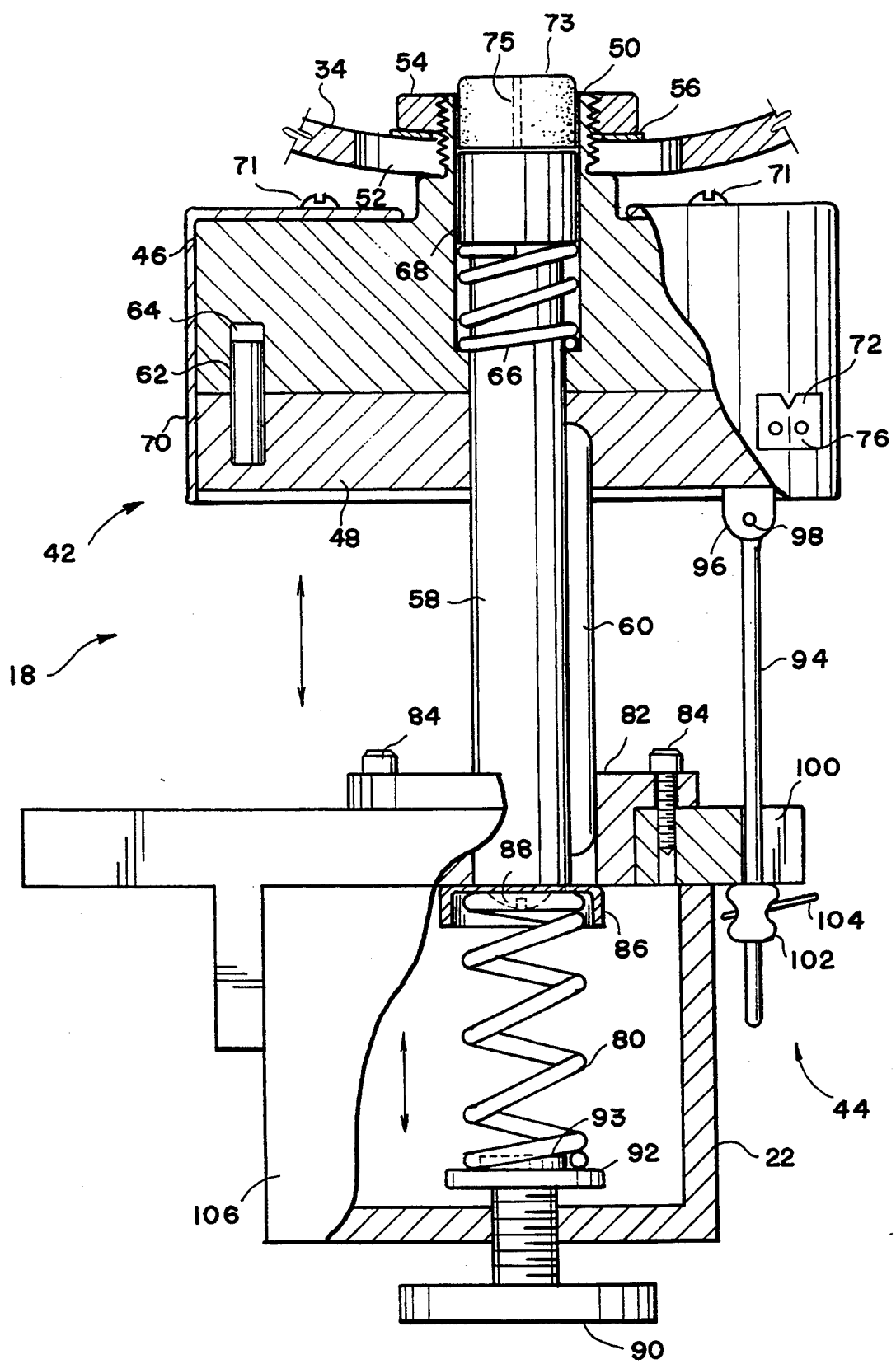
FIG. 4 is a partial fragmentary view of track support member shown largely in cross-section.
Figure 7:
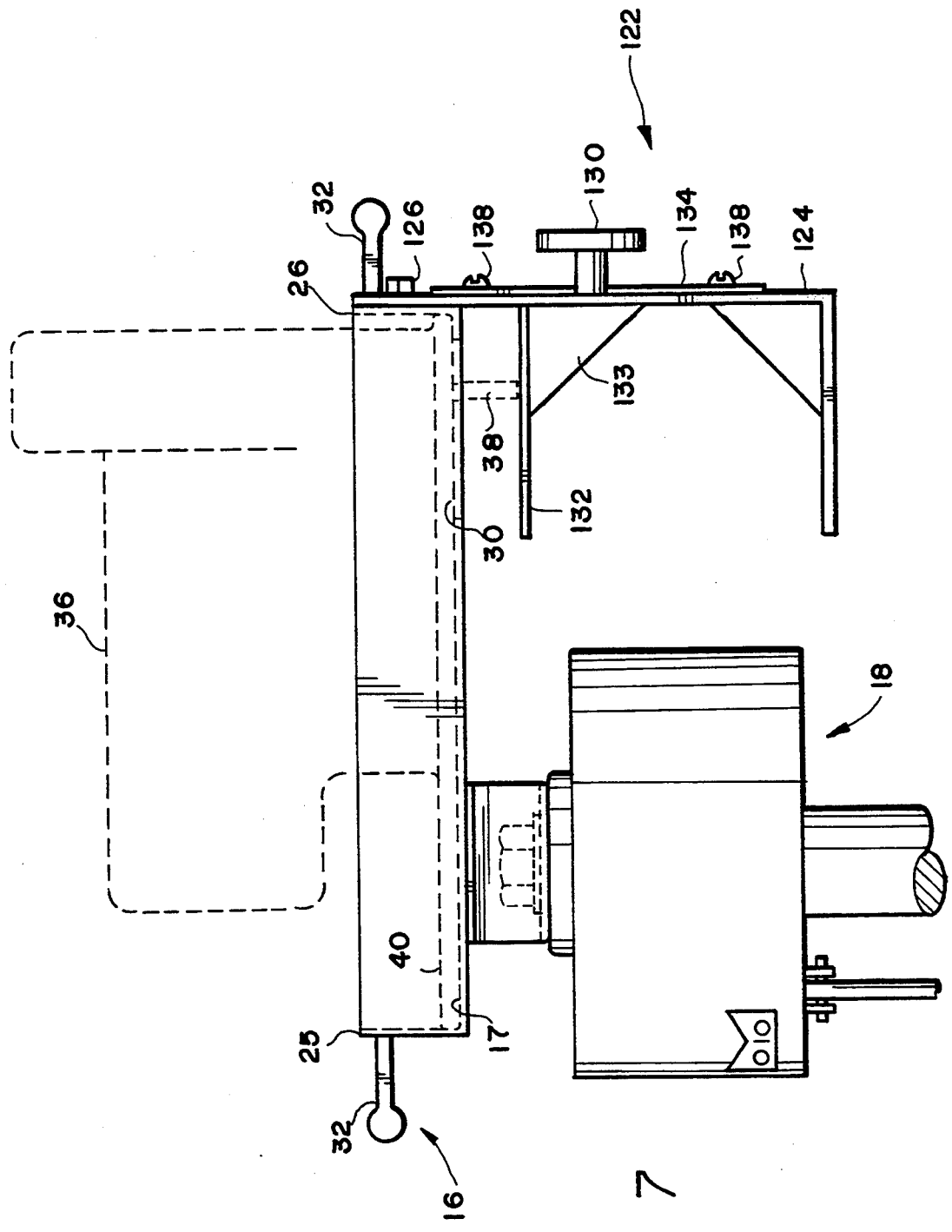
FIG. 7 is a partial frontal view of the invention shown with a depth setting device attached to the saw track.

Disposed below the saw track 16 is an arcuate support bracket 34 that physically engages the track support member 18 as shown in FIG. 4. In operation, a circular saw 36 is positioned on the saw track 16, the saw blade 38 passing through the blade slot 30 as shown in FIG. 7. The track 16 is configured such that the base plate 40 of a standard circular saw 36 will abut both side walls 25,26 of the saw track 16, ensuring a straight cut. The track 16 is also configured such that the blade slot 30 is wide enough to allow for angular adjustment of the saw blade 38 away from the vertical plane for making laterally angled cross-cuts or angled cuts. If the circular saw 36 were to have a base plate 40 which is more narrow than the track platform 17, an elongated spacer 41 may be attached to the left side wall 25 of the saw track 16 with fasteners 43, as indicated in partial view in FIG. 1.

As shown in FIG. 4, the track support member 18 comprises a circular rotational coupling 42 which allows for angular adjustment of the saw track 16 and a biasing member 44 which allows for vertical displacement of the saw track 16. The rotational coupling 42 itself comprises an upper member 46 and a lower member 48, each constructed of solid metal such as steel or aluminum. The upper member 46 is disposed with an integral threaded neck portion 50 that extends upward, serving to engage the arcuate support bracket 34. The arcuate support bracket 34 fits about this threaded neck portion 50 with a longitudinal aperture 52, best shown in FIGS. 2 and 3. The longitudinal shape of this aperture 52 allows for fine adjustment in leveling the saw track 16 in relation to the work surface when the saw guide 10 is installed. Once level, the support bracket 34 is secured in position about this neck portion 50 with a lock nut 54 and an arcuate washer 56 shown in FIG. 4.

As further depicted in FIG. 4, both the upper member 46 and the lower member 48 are concentrically disposed about a partially-keyed shaft 58. This shaft 58 is preferably composed of a metal such as steel that provides the desired strength and rigidity. Partially key-slotted, the lower member 48 fits snugly atop the shaft key 60 that is housed within the lower portion of shaft 58. Due to this arrangement, the lower member 48 is fixed, unable to rotate about the shaft 58. Not engaged by the shaft key 60, the upper member 46 is free to rotate about the shaft 58. This rotation is limited, however, by a set pin 62 that extends upward from the lower member 48. This pin 62 is preferably made of steel and is dimensioned to insert into cavities 64 bored into upper member 46. Several of these cavities 64 are bored in an arcuate arrangement within the upper member 46 such that the upper member 46 may be seated atop the lower member 48, at different angular positions, thereby fixing the saw track 16 at assorted angles.

Encircled within the upper member 46 is a biased spring 66 coiled about the shaft 58. This spring 66 is partially compressed between the upper member 46 and a head portion 68 of the shaft 58, urging the upper member 46 downward toward the lower member 48. To change the cut angle, the saw track 16 is lifted upward against the force of the spring 66 until the upper member 46 is unseated from the lower member 48 and, therefore, free to rotate about the shaft 58. The saw track 16 is then rotated to the desired angle, and the upper member 46 reseated atop the lower member 48, the set pin 62 engaging a different cavity 64. The cavities 64 are preferably arranged such that perpendicular cross-cuts and angled cuts of 15, 30, 45, and 60 degrees could be made in either angular direction away from perpendicular.

To prevent the accumulation of sawdust during use of the saw guide 10, the rotational coupling 42 is fitted with an outer casing 70 that is attached to upper member 46 with fasteners 71. In addition, a vented dust plug 73 is seated snugly within the neck portion 50 of the upper member 46 to prevent the introduction of sawdust into the rotational coupling 42. A vent hole 75 within the plug 73 serves to allow air to escape when angular adjustments are made. To aid the saw user in determining the angle at which the saw track 16 is positioned, the outer casing 70 has a sight window 74 that allows the user to read angular indicia 76 located along the circumference of the lower member 48 that indicates the angular position at which the saw track 16 is set.

Figure 9:
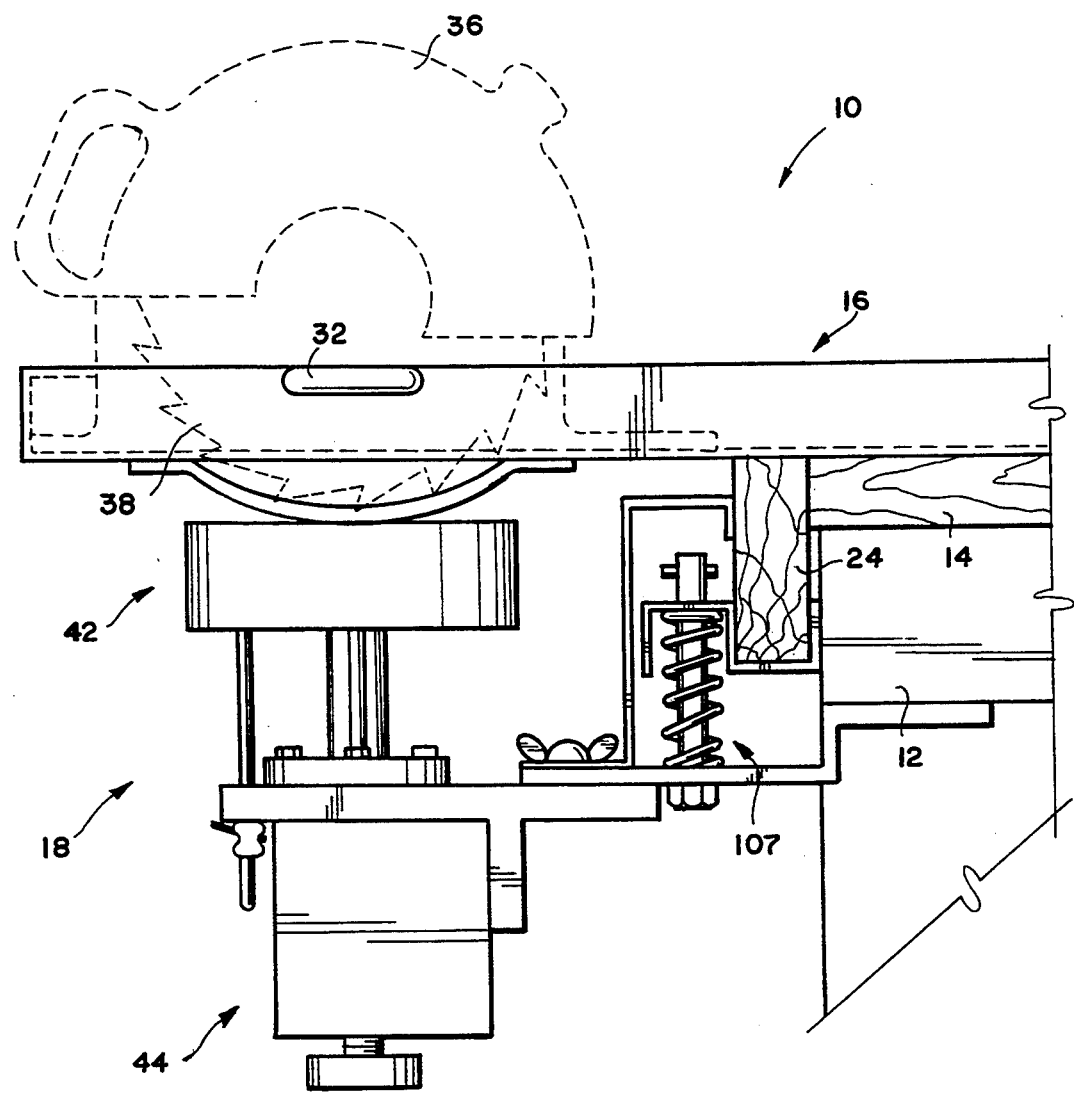
FIG. 9 is a environmental elevational side view of the invention shown with a circular saw atop the saw track positioned as it would be immediately prior to a cut.

Also communicating with shaft 58 is a biasing member 44 which provides for movement of the saw track 16 during usage. The biasing member 44 includes a spring housing 22 made of a metal such as steel or aluminum. Within this housing 22 is a second biased spring 80 that engages and serves to upwardly urge the shaft 58. The shaft 58 enters the spring housing 22 through a key-slotted bushing 82 attached to the spring housing 22 with fasteners 84. This bushing 82 is preferably fabricated of a malleable metal such as brass or copper that reduces friction between the bushing 82 and the shaft 58. To maintain alignment between the spring 80 and the shaft 58, a spring cowling 86 is attached to the shaft 58 with a shaft fastener 88, the cowling 86 partially encapsulating the spring 80. When in use, the saw track 16 is initially elevated by the spring force of spring 80, displacing the shaft 58 upward until the spring cowling 86 abuts the spring housing 22. This spring force is just great enough to support the track 16 in the elevated position with a circular saw 36 resting on the track 16 as shown in FIG. 7. When ready to cut, the user may move the saw track 16 downward flush to the workpiece 14, as shown in FIG. 9.

To accommodate circular saws of different weights, the spring 80 may be adjusted with the adjustment screw 90 threaded into the spring housing 22 as shown in FIG. 4. This screw 90 has a washer 92 with a spring engagement projection 93 which communicates with the spring 80. To increase the spring force, the adjustment screw 90 is simply threaded into the spring housing 22. The spring force is accordingly reduced when the adjustment screw 90 is threaded out from the housing 22. The height at which the saw track 16 is initially elevated may be reduced with a retaining rod 94 incorporated into the track support member 18. This rod 94 is linked to the rotational coupling 42 with a clevis bracket 96 that is attached to the lower member 48, the rod 94 fixed to the clevis bracket 96 with a clevis pin 98.

Figure 5:
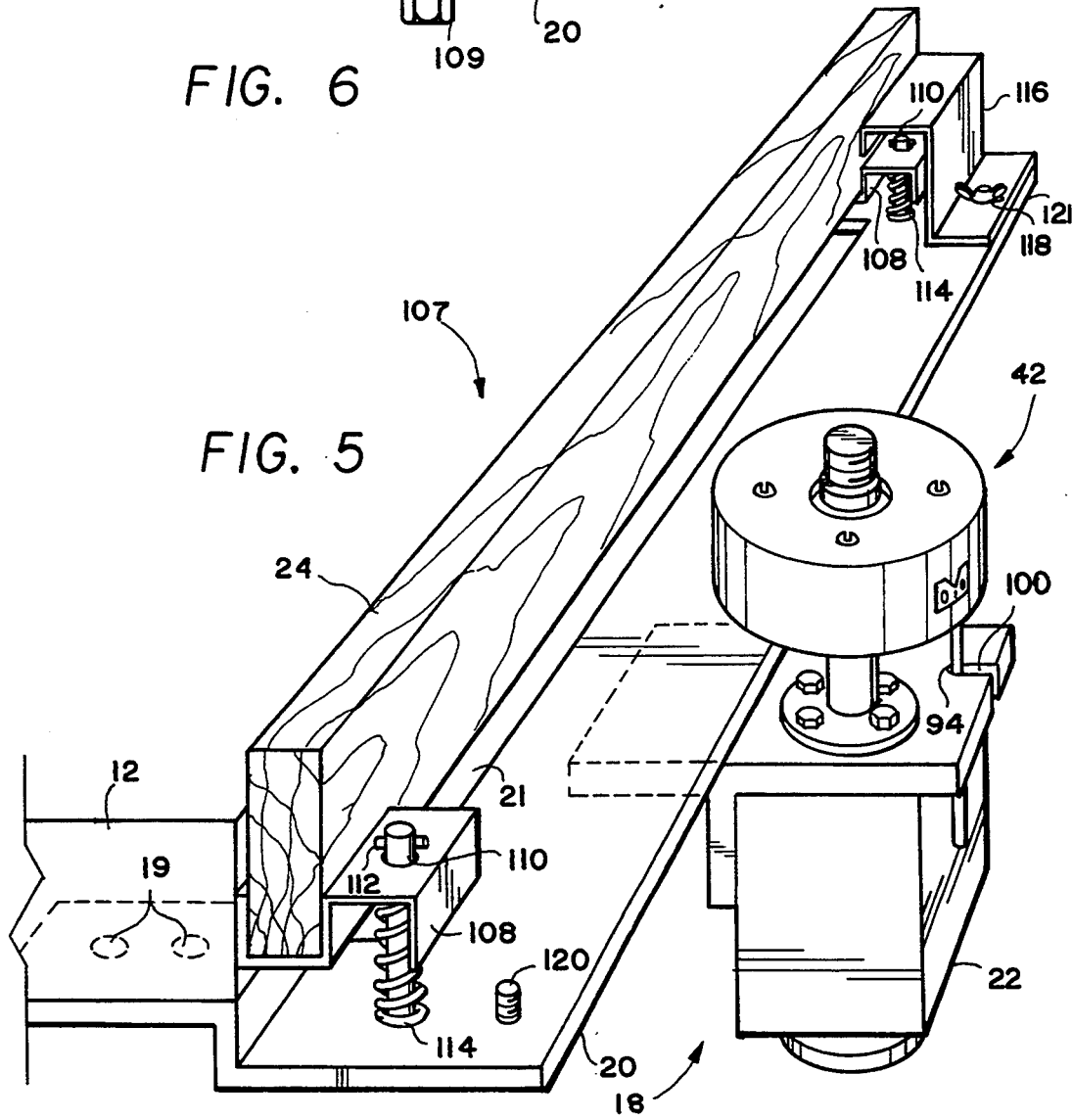
FIG. 5 is an environmental side perspective view of the invention shown with the track support removed.

The rod 94 fits through an opening 100 in an extension of the spring housing 22 as best viewed in FIG. 5. To restrict upward movement of the rod 94 relative to the spring housing 22, the rod 94 is provided with a rod retainer 102 that releasably affixes to the rod 94 below the extended portion of the spring housing 22 as shown in FIG. 4. To alter the initial elevation of the saw track 16, the retainer's position along the rod 94 is changed by releasing the retainer 102 with tab 104. The higher the retainer 102 is fixed about the rod 94, the lower the initial height of the saw track 16 will be. This feature allows the saw user to set the saw track 16 in the compressed position, the track 16 meeting the workpiece 14 and ready to cut as shown in FIG. 9. To prevent the accumulation of sawdust within the spring housing 22, a second outer casing 106 is disposed about the housing 22.

Figure 6:
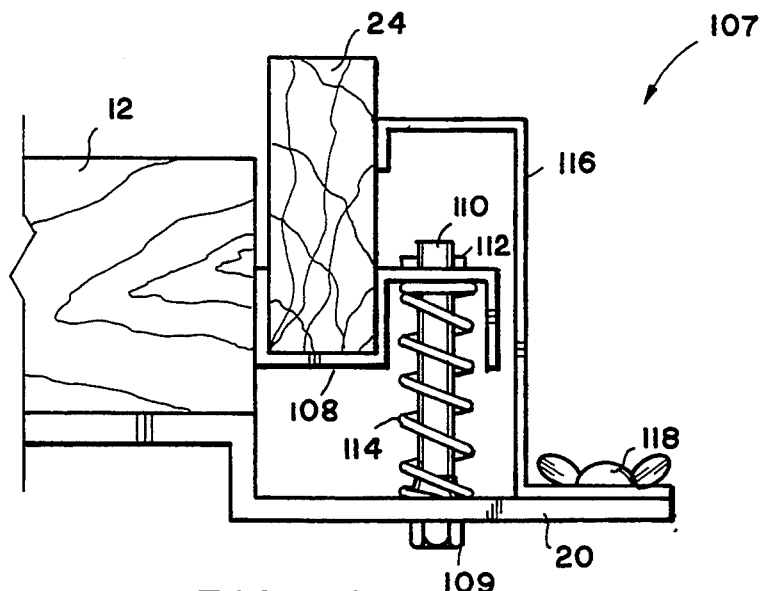
FIG. 6 is an end elevational detail view of the floating fence structure.

As aforementioned, the workpiece 14 abuts against a fence 24 to ensure the correct angle of cut is achieved as depicted in FIG. 1. In this preferred embodiment, this fence 24 is arranged in a floating fence arrangement denoted generally 107, such that the fence 24 may be displaced downward by the saw track 16 until the track 16 meets the workpiece 14 as shown in FIG. 9. This arrangement 107 decreases the depth to which the saw blade 38 must be set to perform the cut, decreasing the potential for injury. In addition, the workpiece 14 is stabilized during the cut due to the downward pressure of the saw track 16 resting atop the workpiece 14. As detailed in FIGS. 5 and 6, the fence 24 is cradled by fence brackets 108 positioned on mounting studs 110 fixed to the mounting bracket 20 with nuts 109. Although vertically slidable along the mounting studs 110, the fence brackets 108 are urged upward against retaining pins 112 by the force of fence springs 114 coiled about the mounting studs 110. To prevent twisting of the fence 24 during use of the saw guide 10, back pressure plates 116 are secured to the mounting bracket 20 which provide lateral support to the fence 24 throughout its vertical travel. These back pressure plates 116 may be easily removed from the mounting bracket 20 (FIG. 5 showing one back pressure plate 116 removed), the plates 116 securing to the bracket 20 with wing nuts 118 that engage small threaded studs 120 secured to mounting bracket 20. To accommodate fences of different widths, the back pressure plates 116 may be adjusted rearwardly or forwardly, the plates 116 incorporating slotted apertures 121 that receive the threaded studs 120.

Figure 8:
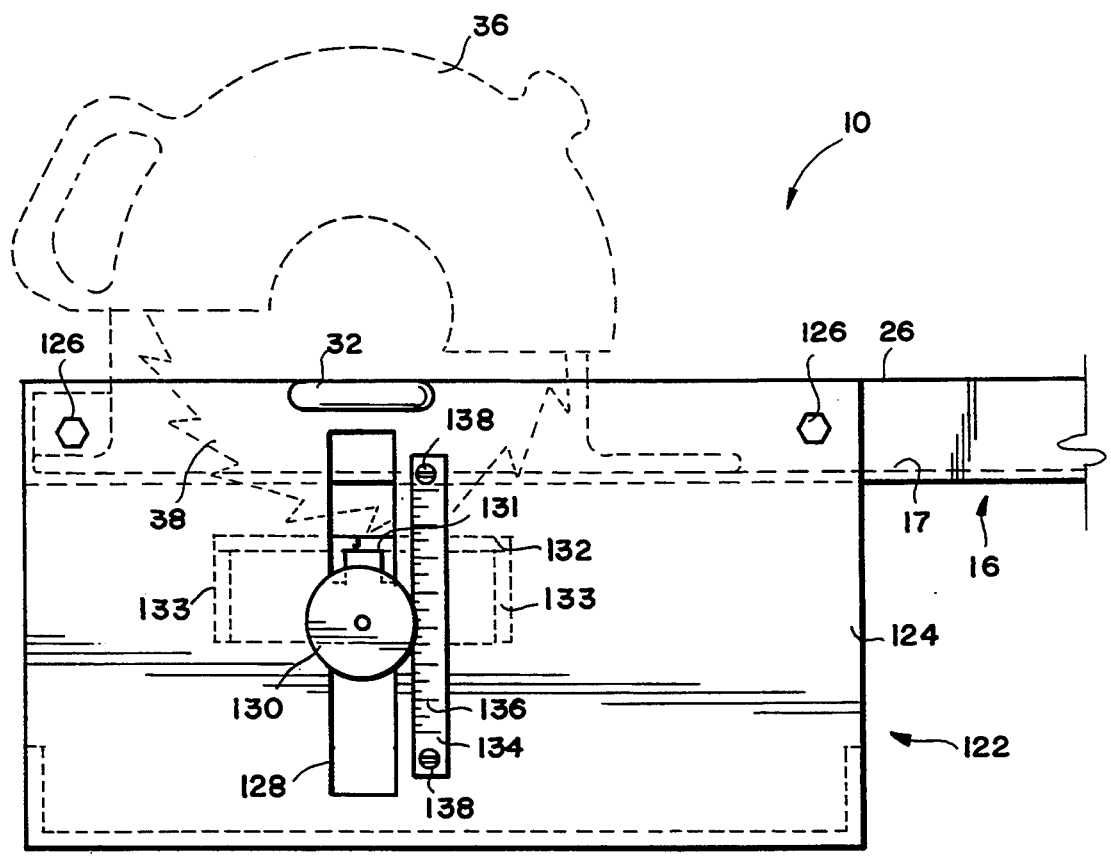
FIG. 8 is a partial elevational side view of the saw track with the depth setting device attached thereto.

Also incorporated into the preferred embodiment is a saw blade depth setting device 122 depicted in FIG. 7, which shows a front view of the saw track 16, and FIG. 8, which shows right-side view of the saw track 16. As shown in these figures, the device 122 comprises a structural support plate 124 that is attached to the right side wall 26 with fasteners 126. As shown most clearly in FIG. 8, the support plate 124 has a vertical slot 128 through which a depth adjustment screw 130 passes to thread into a saw blade rest plate 132. The rest plate 132 is provided with a slot projection 131 that engages the vertical slot 128 of the support plate 124 to maintain a level position, and support triangles 133 for structural stability. Attached to the support plate 124 with mounting fasteners 138 is a depth measure 134 having indicia 136 printed thereon. To adjust the depth to which the blade 38 will cut, the saw user first loosens the depth adjustment screw 130, thereby allowing for vertical movement of the rest plate 132 along the vertical slot 128. When the rest plate 132 is positioned to the desired depth as indicated by the indicia 136, the adjustment screw 130 is retightened. The saw blade 38 is then lowered in typical fashion until it abuts the rest plate 132. Once the saw blade 38 is fixed at this depth, the rest plate 132 may be lowered out of the way of the blade 38, and the saw 36 used for cutting.

FIG. 9 shows the circular saw guide 10 (with the saw blade depth setting device 122 removed for clarity) with a circular saw 36 in place atop the saw track 16 as the guide 10 would appear just prior a cut through the workpiece 14 atop the workbench 12. The saw track 16 is shown displaced downward onto the workpiece 14, the rotational coupling 42 of the track support 18 and the fence 24 also displaced downward due to the compressive force supplied by the saw user. Once the cut is completed by running the saw 36 forward along the saw track 16, thereby running the saw blade 38 through the workpiece 14, the user removes the compressive downward force and the saw track 16 returns to its initial elevated position above the workbench 12, prepared for the next cut. The elevated position of the saw track 16 allows the saw user to easily remove the workpiece 14, now cut into two pieces, and place the next workpiece in position for cutting, expediting the cutting process. Use of the saw guide 10 is further expedited due to the ease with which the saw track 16 is angularly adjusted as described above.

It is to be understood that the present invention is not limited to the sole embodiment described above, but encompasses any and all embodiments within the scope of the following claims.

I claim:

1. A circular saw guide for use in cutting a workpiece, comprising:
    a walled saw track having a blade slot defined therethrough and an arcuate support bracket attached thereunder;
    a track support member connected to said arcuate support bracket wherein said track support member includes means for allowing vertical displacement of said saw track;
    said means for allowing vertical displacement of said saw track comprising a shaft, a biased spring supporting said shaft, and a spring housing enclosing said spring, a portion of said shaft passing into said spring housing; and
    a mounting bracket attached to said track support member such that said support member may be secured to a standard workbench.

2. A circular saw guide according to claim 1, further comprising a workpiece abutting apparatus attached to said mounting bracket.

3. A circular saw guide according to claim 2, wherein said workpiece abutting apparatus comprises a floating fence arrangement having a fence, there further being fence brackets cradling said fence, and mounting studs extending upwardly from said mounting bracket, said fence brackets being disposed thereon, said mounting studs having concentrically coiled biased springs which are configured to resist downward travel of said fence brackets.

4. A circular saw guide according to claim 3, wherein said floating fence arrangement further comprises back pressure plates fixed to said mounting bracket, said plates preventing lateral movement of said fence.

5. A circular saw guide according to claim 1, wherein said means for allowing vertical displacement of said saw track further comprises an adjustment screw threaded into said spring housing for altering the spring force supporting said saw track.

6. A circular saw guide according to claim 1, wherein said means for allowing vertical displacement of said saw track further comprises a height limiting device, said device comprising a rod that extends downward through an opening formed in said spring housing, said rod having a retainer device disposed about its circumference below said opening such that said rod is restrained from upward travel through said opening, thereby limiting upward travel of said shaft.

7. A circular saw guide according to claim 1, wherein said track support member includes means for adjusting the angular position of said saw track.

8. A circular saw guide according to claim 7, wherein said means for adjusting the angular position of said saw track is a rotational coupling comprising an upper and lower member, each concentrically disposed about said shaft, said upper member configured to engage said arcuate support bracket, said lower member having a keyed slot, a key fixed on said shaft and fitted within said keyed slot, said lower member also having an upwardly extending set pin, a plurality of cavities defined in said upper member and arranged such that said upper member may be separated from said lower member and replaced onto said lower member, said set pin engaging at least one of said cavities.

9. A circular saw guide according to claim 8, wherein said rotational coupling further comprises a biasing means for urging said upper member toward said lower member.

10. A circular saw guide according to claim 9, wherein said biasing means comprises a biased spring substantially enclosed within said upper member and concentrically disposed about said shaft, there further being a shaft head portion located atop said shaft, said spring being partially compressed between said upper member and said shaft head portion.

11. A circular saw guide according to claim 1, further comprising a saw blade depth setting device, and a saw blade depth setting device mounting means attached to said saw track, said depth setting device mounting means having a vertical slot defined therethrough, there further being a saw blade rest plate and an adjustment screw passing through said slot, said screw securing said rest plate to said support plate.

12. A circular saw guide for use in cutting a workpiece, comprising:
    a walled saw track having a blade slot defined therethrough and an arcuate support bracket attached thereunder, said saw track also having an attached saw blade depth setting device;
    a track support member connected to said arcuate support bracket, said track support member having a means for allowing vertical displacement of said saw track and a means for adjusting the angular position of said saw track;
    said means for allowing vertical displacement of said saw track comprising a shaft supported by a biased spring, said spring enclosed within a spring housing, a portion of said shaft passing into said spring housing; and
    a mounting bracket attached to said track support member such that said support member may be secured to a standard workbench, said mounting bracket having a floating fence arrangement mounted thereto.

13. A circular saw guide according to claim 12, wherein said saw depth setting device comprises a structural support plate, there further being a vertical slot defined therethrough, a saw blade rest plate, and an adjustment screw passing through said slot, said screw securing said rest plate to said support plate.

14. A circular saw guide according to claim 12, wherein said means for adjusting the angular position of said saw track comprises a biased rotational coupling having an upper and lower member each concentrically disposed about said shaft, said upper member being urged toward said lower member and configured to engage said arcuate support bracket, said lower member having a keyed slot, a key fixed on said shaft and fitted within said keyed slot, said lower member also having an upwardly extending set pin, a plurality of cavities defined in said upper member and arranged such that said upper member may be separated from said lower member and replaced onto said lower member, said set pin engaging at least one of said cavities.

15. A circular saw guide according to claim 12, further comprising a floating fence arrangement having a fence, there further being fence brackets cradling said fence, and mounting studs extending upwardly from said mounting bracket, said fence brackets being disposed thereon, said mounting studs having concentrically coiled biased springs which are configured to resist downward travel of said fence brackets.

* * * * *